United States Patent
Chartier

(10) Patent No.: US 10,883,386 B2
(45) Date of Patent: Jan. 5, 2021

(54) METHODS AND DEVICES FOR TURBINE BLADE INSTALLATION ALIGNMENT

(71) Applicant: Mitsubishi Hitachi Power Systems Americas, Inc., Lake Mary, FL (US)

(72) Inventor: Justin Chartier, Savannah, GA (US)

(73) Assignee: Mitsubishi Hitachi Power Systems Americas, Inc., Lake Mary, FL (US)

( * ) Notice: Subject to any disclaimer, the term of this patent is extended or adjusted under 35 U.S.C. 154(b) by 511 days.

(21) Appl. No.: 15/629,052

(22) Filed: Jun. 21, 2017

(65) Prior Publication Data

US 2018/0371950 A1 Dec. 27, 2018

(51) Int. Cl.
| | |
|---|---|
| *F01D 5/30* | (2006.01) |
| *F01D 25/28* | (2006.01) |
| *B23P 19/10* | (2006.01) |
| *B23P 19/04* | (2006.01) |

(52) U.S. Cl.
CPC ............ *F01D 25/285* (2013.01); *B23P 19/10* (2013.01); *F01D 5/3007* (2013.01); *B23P 19/04* (2013.01); *F01D 25/28* (2013.01); *F05D 2230/60* (2013.01); *F05D 2230/64* (2013.01)

(58) Field of Classification Search
CPC .. F01D 25/285; F01D 5/3007; F05D 2230/64; F05D 2230/60; F05D 2220/32; F02C 1/00; B23P 19/10
See application file for complete search history.

(56) References Cited

U.S. PATENT DOCUMENTS

| | | | | |
|---|---|---|---|---|
| 5,737,816 | A | * | 4/1998 | Hartmann ............. F01D 5/3007 29/23.51 |
| 2012/0251327 | A1 | * | 10/2012 | Dimmick, III .......... F01D 5/005 416/219 R |
| 2015/0369062 | A1 | | 12/2015 | Tanaka |
| 2016/0201556 | A1 | * | 7/2016 | Kolvick ................ F01D 5/3007 29/888.012 |
| 2016/0319681 | A1 | * | 11/2016 | Jendrix .................... F01D 11/02 |
| 2017/0145841 | A1 | * | 5/2017 | Congratel ............... F01D 9/042 |
| 2019/0292922 | A1 | * | 9/2019 | Freeman ................. F01D 5/147 |

* cited by examiner

*Primary Examiner* — Orlando E Aviles
*Assistant Examiner* — Mahdi H Nejad
(74) *Attorney, Agent, or Firm* — Schwegman Lundberg & Woessner, P.A.

(57) ABSTRACT

Devices, systems and methods of the present disclosure can include a guide for installing an airfoil component in a slotted component of a gas turbine engine. The guide can comprise a guide body, a guide slot and an alignment appendage. The guide body can comprise a slot-facing side, an entry side, and a radially outer side surface connecting the slot-facing side and the entry side. The guide slot can extend from the entry side to the slot-facing side and can penetrate the radially outer side surface. The guide slot can have a silhouette matching that of a root portion of the airfoil component. The alignment appendage can extend from the guide body and can have a geometry for axial engagement with a circumferential feature of the slotted component into which the airfoil component is to be installed.

21 Claims, 10 Drawing Sheets

METHODS AND DEVICES FOR TURBINE BLADE INSTALLATION ALIGNMENT

TECHNICAL FIELD

The present application pertains generally, but not by way of limitation, to gas turbine engines. More particularly, the present application is directed to, but not by way of limitation, methods and systems for installing components in a gas turbine engine.

BACKGROUND

Gas turbine engines operate by passing a volume of gases through a series of compressors and turbines in order to produce rotational shaft power. High energy gases rotate a turbine to generate the shaft power. The shaft power drives a compressor to provide compressed air to a combustion process that generates the high energy gases for turning the turbine. In an aircraft engine, the turbine can be used to generate propulsion, such as directly via thrust, or indirectly via a shaft and fan or propeller. In an industrial gas turbine, the shaft power can drive a generator that produces electricity. Alternatively, a power turbine can be used to drive a shaft for powering the generator.

Each compressor and turbine includes a plurality of stages of stator vanes (also known as nozzles or stators) and rotor blades (also known as buckets), each vane and blade including an airfoil. In general, vanes redirect the trajectory of gases coming off the blades for flow into the next stage. In the compressor, vanes convert kinetic energy of moving gases into pressure, while, in the turbine, vanes accelerate pressurized gases to extract kinetic energy. In the compressor, the rotating blades push gases past the stationary vanes. In the turbine, the rotating blades extract rotational power from flowing gases.

Each blade is typically mounted to a rotating disk (also known as a rotor or rotor component) that, directly or indirectly, drives or is driven by a shaft of the gas turbine engine. Thus, in order to assemble the blades to the rotor, such as at initial manufacturing, installation of the gas turbine engine or during repair procedures, it is necessary to attach the blade to the rotor. Typical attachment mechanisms involve a shaped blade root, such as a fir tree or dovetail shape, that is slid in to a correspondingly shaped root slot in a rim of the rotor. This process is typically conducted manually.

Various methods and system for assembling turbine components are described in U.S. Pat. No. 5,737,816 to Hartmann et al. and U.S. Pub. No. 2016/0201556 to Kolvick et al.

OVERVIEW

The present inventors have recognized, among other things, that assembling of turbine airfoil components, such as vanes and blades, to corresponding slotted components, such as in a shroud or disk, can sometimes require precise alignment in order to avoid damaging the various components. For a variety of reasons, the vanes and blades can be produced separately from the component to which they will be attached. For example, turbine blades are separately provided with a bond coating and a thermal barrier coating to improve thermal resistance in the gas path. The rotor is typically not subject to direct gas path impingement and, therefore, typically does not include separate coatings. Thus, care must be taken when inserting a coated blade root into a rotor slot. Adjacent blades can chip the thermal barrier coating and bond coating if there is misalignment between the components during installation.

The subject matter of the present disclosure can help provide solutions to these and other problems, such as by providing a guide tool that facilitates alignment of a blade root with a rotor slot before the components are brought into engagement. The guide tool can have an appendage or an alignment feature that engages a circumferential locating feature on the rotor that is located in a known or fixed position relative to the rotor slot. The guide tool can include a guide slot that is located the same distance from the appendage that the circumferential locating feature is located from the rotor slot.

In an example, a guide for installing an airfoil component in a slotted component of a gas turbine engine can comprise a guide body, a guide slot, and an alignment appendage. The guide body can comprise a slot-facing side, an entry side, and a radially outer side surface connecting the slot-facing side and the entry side. The guide slot can extend from the entry side to the slot-facing side and can penetrate the radially outer side surface. The guide slot can have a silhouette matching that of a root portion of the airfoil component. The alignment appendage can extend from the guide body and can have a geometry for axial engagement with a circumferential feature of the slotted component into which the airfoil component is to be installed.

In another example, a gas turbine engine blade alignment device can be configured for use with a turbine rotor component that can comprise an annular disk portion extending in a radial direction from a central axis, a rim portion surrounding the annular disk portion in a circumferential direction, and a plurality of blade root slots extending through the rim portion in an axial direction, each blade root slot having a silhouette of a root geometry profile. The gas turbine engine blade alignment device can comprise a guide tool that can comprise a guide body including a guide slot having a shape matching the silhouette of the root geometry profile, and an axial projection extending from the guide body circumferentially spaced from the guide slot, the axial projection can have a shape of the root geometry profile.

In yet another example, a method of installing an airfoil component having a root in a slotted component having a root slot in a gas turbine engine system can comprise axially inserting an alignment appendage of a guide tool into a circumferential locating feature of the slotted component to align a guide slot of the guide tool with the root slot of the slotted component, positioning the root of the airfoil component into the guide slot; and sliding the airfoil component through the guide slot and into the root slot.

This overview is intended to provide an overview of subject matter of the present patent application. It is not intended to provide an exclusive or exhaustive explanation of the invention. The detailed description is included to provide further information about the present patent application.

Figure 1:
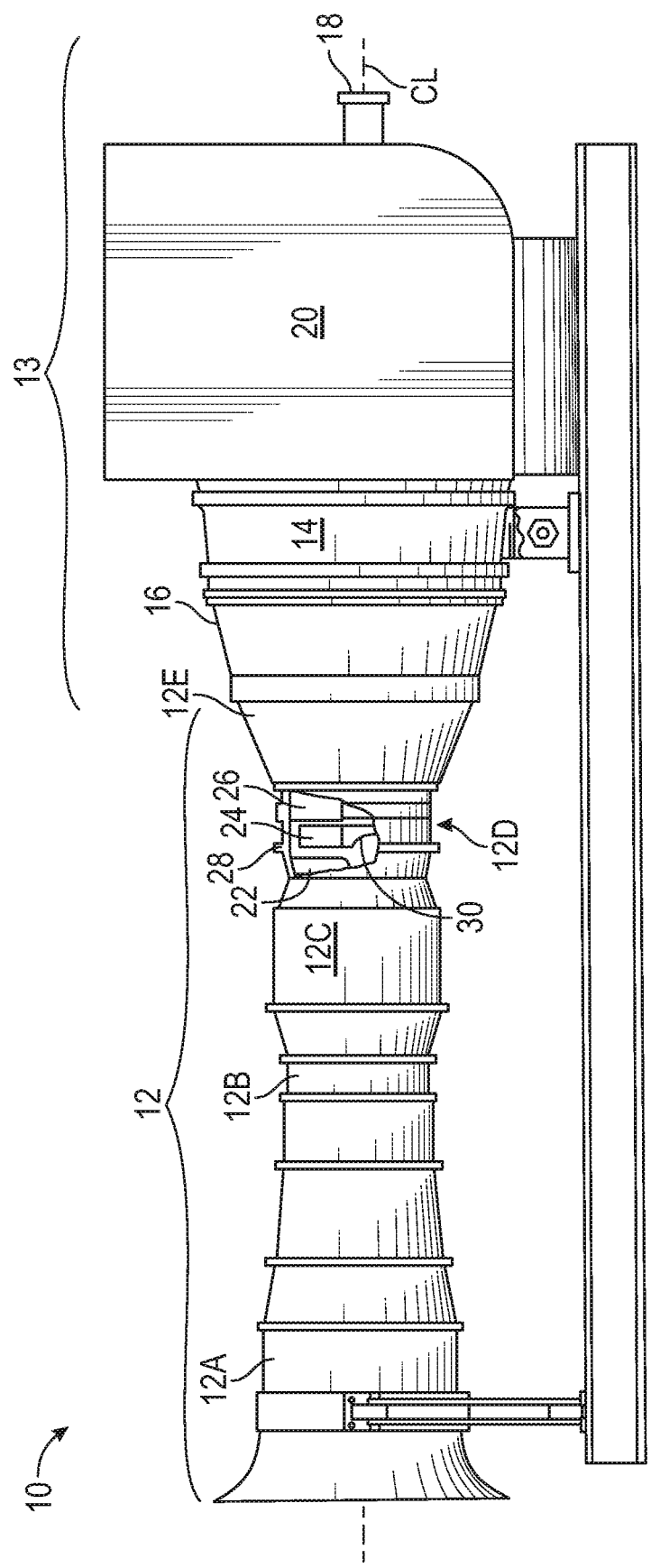
FIG. 1 is a partially broken away side view of an industrial gas turbine engine showing a portion of a turbine section of a gas generator disposed between a combustor section and a power generator.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a partially broken away side view of gas turbine engine 10 showing gas generator 12 connected to power generator 13 via power turbine 16. In the illustrated embodiment, gas turbine engine 10 is an industrial gas turbine engine circumferentially disposed about a central, longitudinal axis or axial engine centerline CL. Gas generator 12 can comprise, in series order from front to rear, low pressure compressor section 12A, high pressure compressor section 12B, combustor section 12C, high pressure turbine section 12D, and low pressure turbine section 12E. Power generator 13 can comprise power turbine 16, which is disposed aft of low pressure turbine section 12E, power turbine exhaust section 14, output shaft 18 and exhaust duct 20. Rotation of power turbine 16 drives output shaft 18, which may be coupled to an electrical generator (not shown) that is also part of power generator 13. Power turbine 16 may, for example, also drive a pump (not shown) or gearbox (not shown). Gas generated by gas generator 12 passes through power turbine 16 and leaves engine 10 via exhaust duct 20.

As is known in the art of gas turbine engines, incoming ambient air becomes pressurized within low and high pressure compressor sections 12A and 12B. Fuel mixes with the pressurized air in combustor section 12C, where it is burned. Once burned, combustion gases expand through high and low pressure turbine sections 12D and 12E and through power turbine 16, thereby causing rotation. From power turbine 16, the combustion gases flow through power turbine exhaust section 14 and out exhaust duct 20. High and low pressure turbine sections 12D) and 12E drive high and low pressure rotor shafts, respectively, within engine 10 that rotate in response to the flow of the combustion gases thereby rotating the attached high and low pressure compressor sections 12B and 12A, respectively, to sustain the combustion process.

It is understood that FIG. 1 provides a basic understanding and overview of the various sections and the basic operation of an industrial gas turbine engine and that those skilled in the art will understand the complexities of gas turbine engine operation and the Brayton cycle. Although described with reference to an aeroderivative industrial gas turbine engine having a power turbine, the present application is applicable to all types of gas turbine engines, including those with aerospace or aircraft applications, and more generally to any rotating shaft system having separable component interfaces at one or more locations. Although FIG. 1 is described with reference to high and low pressure spools ("dual spool"), the present disclosure may be used with single spool engines having only a single compressor stage and a single turbine stage. Additionally, while an embodiment of engine 10 has been described having low and high pressure turbine sections with connection to an electrical generator via a power turbine, it will be appreciated that the scope of the disclosure is not so limited, and may apply to other arrangements, such as those connected to an electrical generator via the compressor shaft, for example. A gas turbine system as described herein can include a power turbine, a high pressure turbine, a low pressure turbine, a high pressure compressor, and a low pressure compressor, and any component, system or sub-system of a gas turbine engine, industrial gas turbine or the like including rotating components and stationary components that can included slotted interfaces between components.

High pressure turbine section 12D can comprise first stage vane 22, first stage turbine blade 24 and second stage vane 26. First stage vane 22 and second stage vane 26 can be joined to engine case 28 at their radially outer ends, such as via a slotted interface. First stage turbine blade 24 can be connected to first stage rotor disk 30 at its radially inner end, such as via a slotted interface.

The present disclosure is directed towards features for installing airfoil components, such as vane 22, vane 26 and blade 24, into a corresponding component, such as engine case 28 or rotor disk 30. In particular, the present disclosure is particularly useful in installing components of keyed or slotted connections, such as those commonly found in a blade root and rotor slot connection used in turbine sections of gas turbine engines. As such, the present disclosure is described in greater detail with reference to turbine blade 24 and rotor disk 30 in FIGS. 2-14. However, the present disclosure is applicable to other components of gas turbine engines, such as other rotating components, stationary components, shrouds, cases and the like. For example, gas turbine engine 10 may include additional stages of blades, such those in low pressure turbine section 12E, compressor sections 12A and 12B and power turbine 16, that can incorporate the features of the present disclosure, but are not described for brevity.

Figure 2:
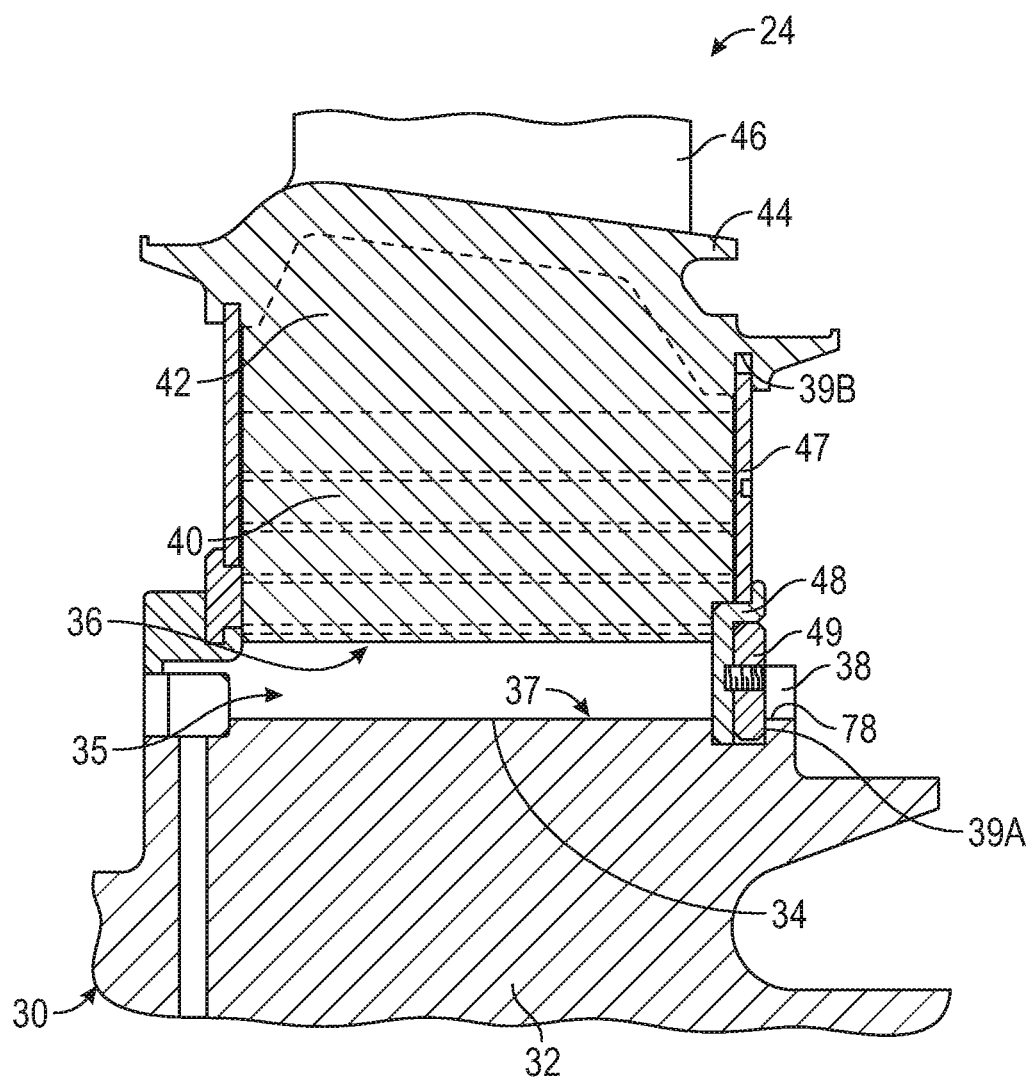
FIG. 2 is a schematic cross-sectional view of a rotor assembly of the turbine section of FIG. 1 showing a rotor component having a seal rail and an airfoil component having a root portion coupled to the rotor component.

FIG. 2 is a schematic side view of rotor disk 30 and turbine blade 24. Rotor disk 30 can comprise annular disk portion 32, rim portion 34, and seal rail 38. Material is machined from the rim portion 34 of the rotor disk 30 to form one or more disk slots 35 (including root portion 36 and broach portion 37) within the rotor disk 30. Turbine blade 24 can comprise blade root 40, shank 42, platform 44 and airfoil 46. Rim portion 34 can comprise material of rotor disk 30 configured to produce root portion 36. Root portion 36 can comprise surfaces configured to engage mating surfaces of blade root 40. Beneath the surfaces of root portion 36 can be located surfaces of broach portion 37. Broach portion 37 can comprises a bottom, or radially inward extension of root portion 36 that remains unoccupied by a portion of turbine blade 24. Broach portion 37 can be used to pass cooling air through rotor disk 30 and into blade root 40, as is known in the art. Broach portion 37 can be fabricated at the same time root portion 36 is produced and can extend through seal rail 38 to form notch 78 (see FIG. 4). Thus, notch 78 circumferentially aligns with broach portion 37, which in turn is circumferentially aligned with root portion 36. As such, broach portion 37 and notch 78 can be used as circumferential alignment features to ensure a guide tool of the present disclosure aligns properly with root portion 36. Furthermore, broach portion 37, notch 78 and root portion 36 can be used as circumferential alignment features for mounting of a blade into an adjacent or neighboring root portion 36 because the circumferential distance between adjacent or neighboring broach slots 37, notches 78 and root slots 36 is the same around the circumference of rotor disk 30.

Turbine blade 24 extends in a radial direction up from disk slot 35 relative to the orientation of FIG. 2. Blade root 40 can be slid axially into root portion 36 of disk slot 35 in left and right directions relative to the orientation of FIG. 2. Additional turbine blades can be installed into additional disk slots that are circumferentially spaced from turbine blade 24 and disk slot 35 into and out of the plane of FIG. 2. Thus, the terms radial, axial and circumferential are described generally with reference to the axis of the gas turbine engine into which the components are mounted, such as centerline CL of FIG. 1.

Figure 5:
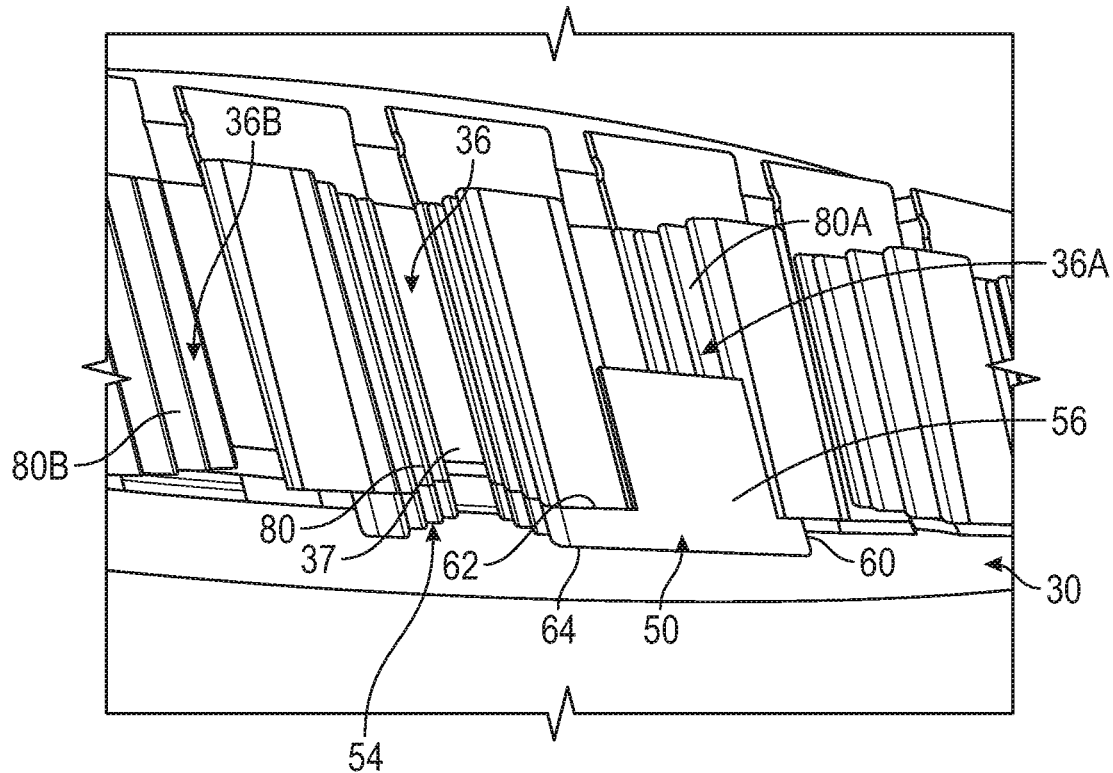
FIG. 5 is a top view of the guide tool and rim portion of FIG. 4.

Root portion 36 and blade root 40 form mating shapes that retain turbine blade 24 radially within rotor disk 30, but allow turbine blade 24 to slide axially within root portion 36. In an example, following axial installation of turbine blade 24 in root portion 36, as discussed below, seal plate 47, retention ring 48 and lock ring 49 may be installed to prevent axial movement of turbine blade 24 and to seal cooling air within turbine blade 24. For example, lock ring 49 can be positioned within channel 39A of seal rail 38 and seal plate 47 can be positioned within channel 39B of platform 44 to prevent movement of turbine blade 24 and retain seal plate 47 and retention ring 48. Further description of seal plate 47, retention ring 48 and lock ring 49 can be found in Pub. No. US 2015/0369062 to Tanaka, which is hereby incorporated by reference in its entirety for all purposes. As used herein, the term "axial" with respect to the orientation of disk slots 35 may include disk slots 35, including root portions 36 and broach portions 37, that are angled with respect to the centerline of the engine in which they are to be used. That is, an "axial" disk slot, including the root portion and the broach portion, may have an axis of symmetry that is non-parallel to the centerline of the engine, as can be seen in FIG. 5.

Figure 3:
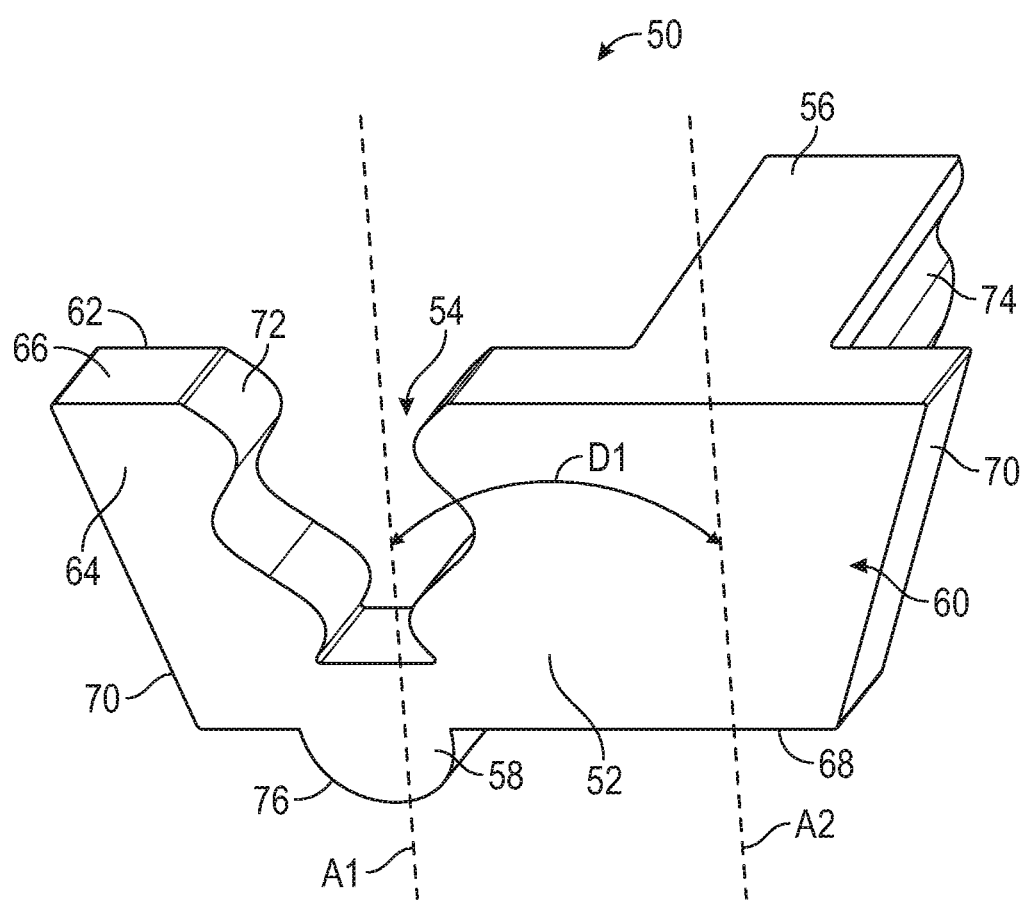
FIG. 3 is a perspective view of an airfoil component installation guide tool having a guide slot and a plurality of alignment appendages.

FIG. 3 is a perspective view of an airfoil component installation guide tool 50 having guide body 52 in which guide slot 54 is located. Guide tool 50 can also include alignment appendages 56 and 58 that can extend from guide body 52. Alignment appendage 56 can extend from wing 60. Guide tool 50 is configured to be placed into engagement with a rotor component, such as rotor disk 30 (FIG. 2), by placing alignment appendages 56 and 58 into circumferential locating features of the rotor component, as shown in in FIGS. 4 and 5, to align guide slot 54 with a disk slot 35 of the rotor component, such as the root portion 36, in order to receive an airfoil component, such as turbine blade 24 (FIG. 2).

Guide body 52 can include rotor-facing side 62 and entry side 64 and a plurality of sides that extend in the axial direction, such as radially outer side 66, radially inner side 68 and circumferential sides 70. Guide slot 54 can extend between rotor-facing side 62 and entry side 64 and can pass through radially outer side 66. Guide slot 54 can have surfaces 72 that form a silhouette of a corresponding blade root profile, such as blade root 40. Surfaces 72 can have any shape suitable for retaining a turbine blade. For example, surfaces 72 can be shaped as a dovetail slot or as a fir tree configuration as shown in FIG. 3. Guide slot 54 opens through radially outer side 66 to permit other portions of turbine blade 24 extending from root portion 40, e.g., shank 42, to pass through guide tool 50. Wing 60 can comprise an extension of the portion of guide body 52 and guide slot 54 and can be circumferentially displaced from guide slot 54. Wing 60 can provide an extension of guide body 52 for supporting an alignment appendage 56. Alignment appendage 58 can be directly supported by guide body 52.

Alignment appendage 56 can include an axial projection having profile surfaces 74 that are configured to engage a root portion 36 that is circumferentially offset from a root portion 36 with which guide slot 54 is configured to align. For example, profile surfaces 74 can comprise a fir tree or dovetail configuration. An additional alignment appendage 58 can include a tab having one or more surfaces including bottom surface 76 that is configured to engage notch 78 in seal rail 38, as shown in FIG. 2. Bottom surface 76 may be circumferentially aligned with guide slot 54.

Guide slot 54 can extend radially along axis A1. Opposing sides of surfaces 72 can be centered on axis A1. That is, half of the space of guide slot 54 can be located on either side of axis A1. Alignment appendage 58 may also be centered along axis A1. Alignment appendage 56 can be circumferentially centered about axis A2. Alignment appendage 56 can extend axially (into the plane of FIG. 3) symmetrically on both sides of axis A2. Axis A1 and axis A2 can be separated by a circumferential distance D1 that can correspond to a distance between adjacent root slots 36 in rotor disk 30 (see FIGS. 4 and 5). Thus, alignment appendages 56 and 58 can be positioned in known or predetermined relationships relative to guide slot 54. Alignment appendages 56 and 58 can correspond to circumferential locating features on a rotor component (e.g., root portion 36 and notch 78, respectively) so that, when alignment appendages 56 and 58 engage the circumferential locating features, it can be ensured that guide slot 54 aligns or substantially aligns with root portion 36 of the rotor disk 30. Substantial alignment can mean that blade root 40 and root portion 36 are aligned to a degree that a coating applied to a portion of the blade 24 will not become damaged when blade root 40 is slid into root portion 36. For example, guide slot 54 can be substantially aligned with root portion 36 within a tolerance band equal to or less than a total amount of clearance with any object that a turbine blade 24 may contact during installation, such as between platform edges of two adjacent turbine blades 24, for example.

Figure 4:
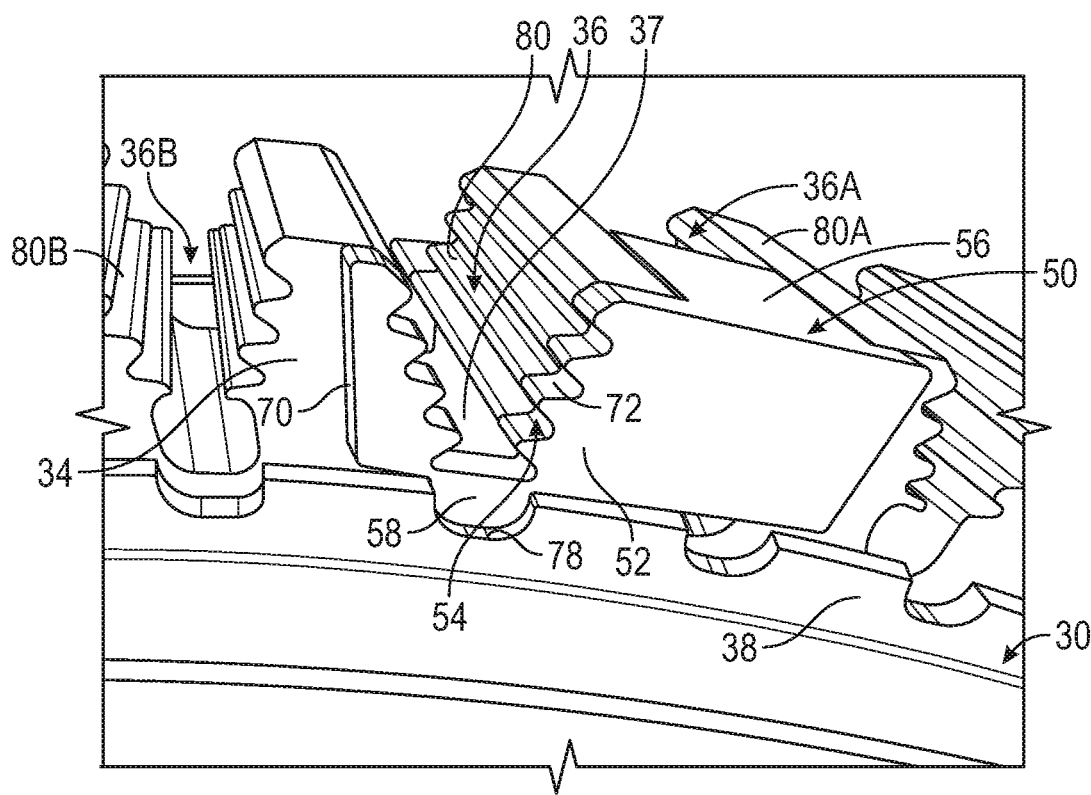
FIG. 4 is a perspective view of the alignment appendages of the guide tool of FIG. 3 coupled to a root slot and a seal rail of a rim portion of a rotor component.

FIG. 4 is a perspective view of alignment appendages 56 and 58 of the guide tool 50 of FIG. 3 coupled to root portion 36 and seal rail 38 of rim portion 34 of rotor disk 30. Rim portion 34 of the rotor disk 30 can include root portion 36 as well as neighboring root slots 36A and 36B. Seal rail 38 can include notch 78. Root portion 36 can include surfaces 80 that form features for engaging corresponding features of blade root 40.

FIG. 5 is a top view of guide tool 50 and rim portion 34 of FIG. 4 showing alignment appendage 56 inserted into root portion 36A while guide slot 54 aligns with root portion 36. FIGS. 4 and 5 are discussed concurrently.

Rotor disk 30 can include rim portion 34 into which root slots 36, 36A and 36B are disposed. Seal rail 38 can be integral with rim portion 34 or otherwise connected to rotor disk 30. Seal rail 38 and notch 78 may be used to secure seal plate 47 (FIG. 2) to rim portion 34 of rotor disk 30.

Alignment appendage 56 can be slid axially into slot 36A so that profile surfaces 74 (FIG. 3) engage surfaces 80 of rotor slot 36A. This placement of alignment appendage 56 positions guide slot 54 into position axially aligned with root portion 36. Additionally, positioning of alignment appendage 56 into slot 36A positions alignment appendage 58 in alignment with notch 78. Rotor-facing side 62 of guide body 52 can be slid into contact with rim portion 34, thereby giving visual confirmation that surfaces 72 of guide slot 54 are aligned with surfaces 80 of root portion 36. Before rotor-facing side 62 contacts rim portion 34, surface 76 (best seen with reference to FIG. 3) of alignment appendage 58 engages notch 78 to provide a second circumferential alignment reference point between rim portion 34 and guide tool 50 in addition to the first provided by appendage 56 and slot 36A. Contact of surfaces 74 with surfaces 80A, and surface 76 with notch 78 position guide slot 54 in a desirable circumferential and radial position relative to root portion 36. In an embodiment, proper alignment of guide tool 50 results in surfaces 72 of guide slot 54 being circumferentially and radially aligned with surfaces 80 of root portion 36 such that guide slot 54 becomes an axial extension of root portion 36.

Figure 6A:
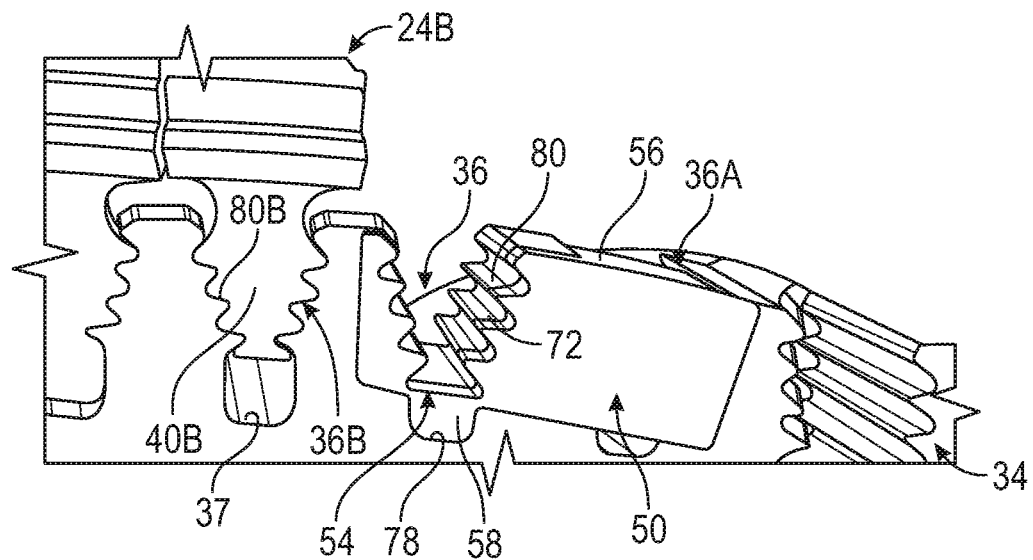
FIG. 6A is a perspective view of the guide tool of FIG. 3 inserted into a root slot of a rotor component, and a root of an airfoil component inserted into an adjacent root slot.
Figure 6B:
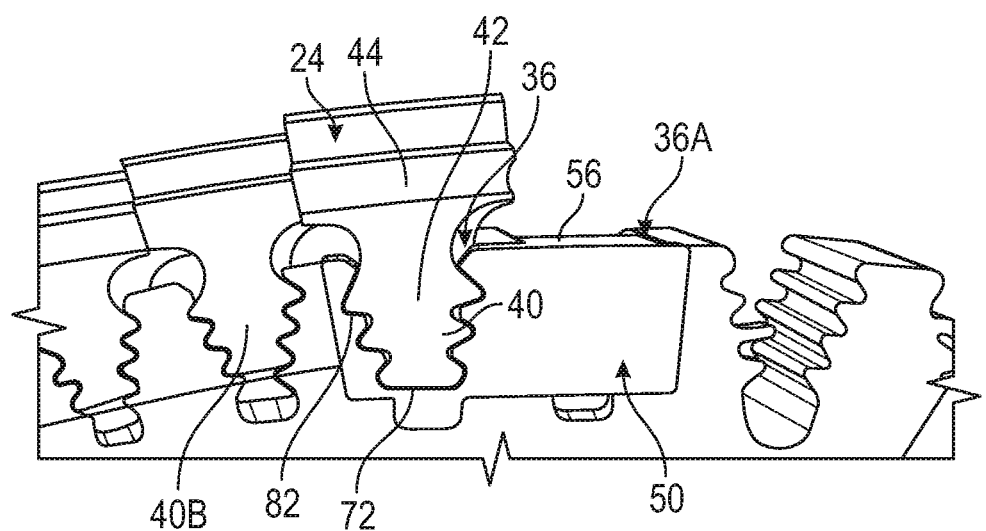
FIG. 6B is a perspective view of the guide tool and rotor component of FIG. 6A with an alignment appendage of the guide tool inserted into a root slot of the rotor component, and a root of an airfoil component inserted into a guide slot of the guide tool.
Figure 6C:
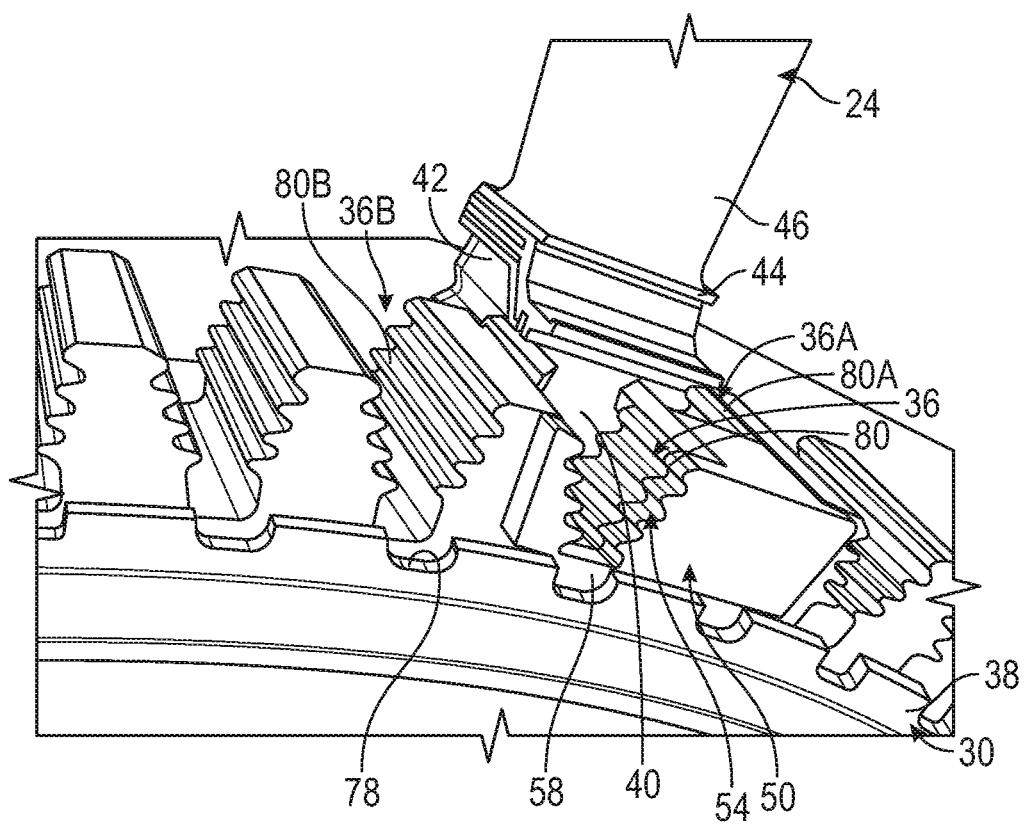
FIG. 6C is a perspective view of the guide tool and rotor component of FIG. 6B with the root pushed through the guide slot and into the root slot of the rotor component.

FIGS. 6A-6C illustrate a sequence of steps that can be performed to install turbine blades 24 into root slots 36 of rotor disk 30 using a guide tool, such as guide tool 50, for example. The steps can be repeated to install a complete set of turbine blades 24 into rotor disk 30 to completely blade the rotor disk 30. Various embodiments of the guide tools described herein can be used to install all of turbine blades 24 into rotor disk 30; no special tools, guides or devices are needed to install the first or last blade. However, guide tool 50 shown in FIGS. 6A-6C can be used to install all but the last blade in a complete blade array.

FIG. 6A is a perspective view of the guide tool 50 of FIG. 3 inserted into root portion 36A of rotor disk 30, and root 40B of turbine blade 24B inserted into root portion 36B. Guide slot 54 of guide tool 50 aligns with root portion 36 in rotor disk 30. With reference to the orientation of FIG. 6A turbine blades 24 can be installed in a clockwise manner in root slots 36 of rim portion 34. For example, turbine blade 24B can be installed in root portion 36B with guide tool 50 inserted into root portion 36, using the process generally described herein. Guide tool 50 can then be removed from root portion 36 and moved to be inserted into root portion 36A, as shown in FIG. 6A, to install a turbine blade 24 into root portion 36. As described with reference to FIGS. 6B and 6C, turbine blade 24 can be assembled to root portion 36 using guide tool 50. Subsequently, guide tool 50 can be removed from root portion 36A and inserted into the next circumferentially clockwise root slot to utilize guide slot 54 to insert a blade root 40 into root portion 36A. In the position of FIG. 6A, guide tool 50 engages rim portion 34 in the manner described with reference to FIGS. 4 and 5 such that surfaces 74 (FIG. 3) of alignment appendage 56 engage surfaces 80A (FIG. 6C) of root portion 36A, and surface 76 of alignment appendage 58 engages notch 78 so that surfaces 72 of guide slot 54 align with surfaces 80 of root portion 36.

FIG. 6B is a perspective view of guide tool 50 and rotor disk 30 of FIG. 6A with alignment appendage 56 inserted into root portion 36A of rotor disk 30, and blade root 40 of turbine blade 24 inserted into guide slot 54 of guide tool 50. With alignment appendages 56 and 58 holding guide tool 50 in position, blade root 40 can be inserted into root portion 36 with appropriate axial alignment to prevent any contract with adjacent components.

Guide tool 50 can be made of a soft material relative to the hardness of the material of blade root 40 and root portion 36. In examples, guide tool 50 can be made of polymeric material, brass or copper. Turbine blades 26 and rotor disk 30 are typically made of hard metal alloys made from titanium, nickel, chrome and cobalt, for example. Furthermore, guide tool 50 can be made of a material that is softer than any coating applied to turbine blade 26. For example, metallic bond coatings (MBC) and thermal barrier coatings (TBC) are brittle compared to the material of rotor disk 30. An example MBC can comprise a MCrAlY alloy, where M is at least one of Ni, Co and Fe. An example TBC can comprise yttria-stabilized zirconia. The thicknesses of the TBC and the MBC are small, on the order of 0.500 millimeters for a TBC and 0.100 millimeters for an MBC. Thus, misalignment of blade root 40 with root portion 36 can cause coatings of blade root 40 or platform 44 to become chipped, cracked, scratched or receive other unwanted degradation. The material of guide tool 50 is thus relatively soft to permit blade root 40 to enter guide slot 54 while mitigating risk of damaging the coatings.

Guide body 52 is sufficiently thick to align surfaces 82 of blade root 40 with surfaces 80 of root portion 36. That is, the length of material of guide slot 54 across the distance between rotor-facing side 62 (FIG. 5) and entry side 64 (FIG. 5) is capable of holding blade root 40 in alignment with root portion 36. In the depicted example, guide body 52 is approximately one sixth the thickness of blade root 40 in the axial direction. However, in other examples, guide body 52 can be 20%, 25%, 33% or 50% of the thickness of blade root. In yet other examples, guide body 52 can be thinner or thicker than the examples listed.

FIG. 6C is a perspective view of guide tool 50 and rotor disk 30 of FIG. 6B with blade root 40 pushed through guide slot 54 and into root portion 36 of rotor disk 30. Because guide slot 54 has aligned blade root 40 with root portion 36, turbine blade 24 can be pushed straight into root portion 36 by an appropriate force, such as by a manual force from installation personnel.

After turbine blade 24 is installed in root portion 36, guide tool 50 can be removed from root portion 36A and inserted into the next neighboring root slot circumferentially spaced, in the clockwise direction with respect to the embodiment of FIGS. 6A-6C, from root portion 36A. Thus, the next turbine blade 24 can be installed in root portion 36A using guide tool 50 and guide slot 54. As mentioned above, this process can be repeated for every root portion 36 provided in rotor disk 30 except for the last turbine blade to be installed due to alignment appendage 56 being aligned with an occupied root portion 36. The last turbine blade can be installed with guide tool 90 or guide tool 94 of FIGS. 8 and 9, respectively, as discussed below. Thereafter, appropriate retention means, such as seal plate 47, retention ring 48 and lock ring 49 of FIG. 2 for example, can be installed.

Figure 7:
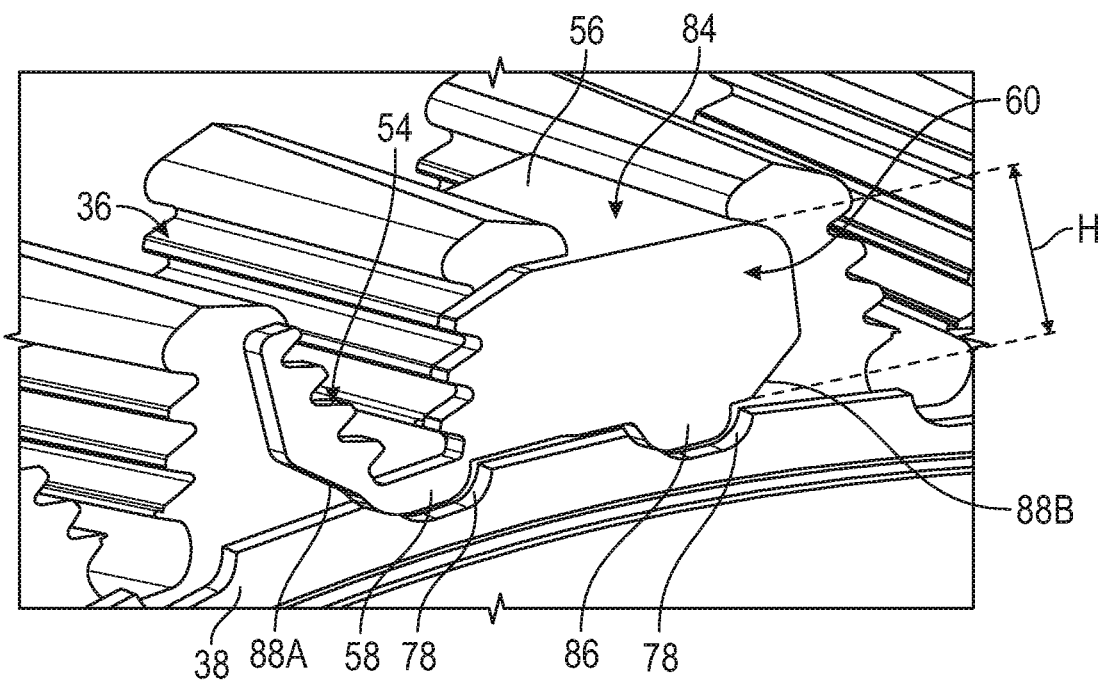
FIG. 7 is a perspective view of another embodiment of an airfoil component installation guide tool of FIGS. 3-5 having a second alignment appendage and a truncated height.

FIG. 7 is a perspective view of airfoil component installation guide tool 84 of FIGS. 3-5 having third alignment appendage 86 and a truncated height, as compared to installation guide tool 50. Guide tool 84 includes the same features as guide tool 50 with the addition of alignment appendage 86 to compliment alignment appendages 56 and 58. Thus, the same reference numbers are used in FIG. 7 and further description of features previously discussed is not provided for the sake of brevity. Guide tool 84 includes alignment appendage 86 which comprises a tab that extends radially inward from wing 60 to engage a second notch 78 of seal rail 38. Alignment appendage 86 includes surfaces configured to mate with surfaces of notches 78. Thus, alignment appendage 86 can be axially slid into second notch 78 to help align guide slot 54 with root portion 36. Alignment appendage 86 provides a third circumferential alignment reference point between guide tool 84 and rim portion 34, in addition to the two provided by alignment appendages 56 and 58.

Guide tool 84 has a radial height H that is truncated compared to the radial height of guide tool 50 of FIGS. 4 and 5. As shown in FIGS. 4 and 5, guide body 52 extends to the radial outer extent of rim portion 34 between adjacent root slots 36. However, guide body 52 of guide tool 84 stops short of the radial outer extent of rim portion 34. This can be done to reduce the size and weight of guide tool 50 to facilitate handling, to reduce the material of guide tool 84 to reduce manufacturing costs, and to prevent potential interference of guide tool 84 with other engine components. Guide tool 84 can also include chamfers 88A and 88B that can provide the same benefits as the truncated height H.

Figure 8:
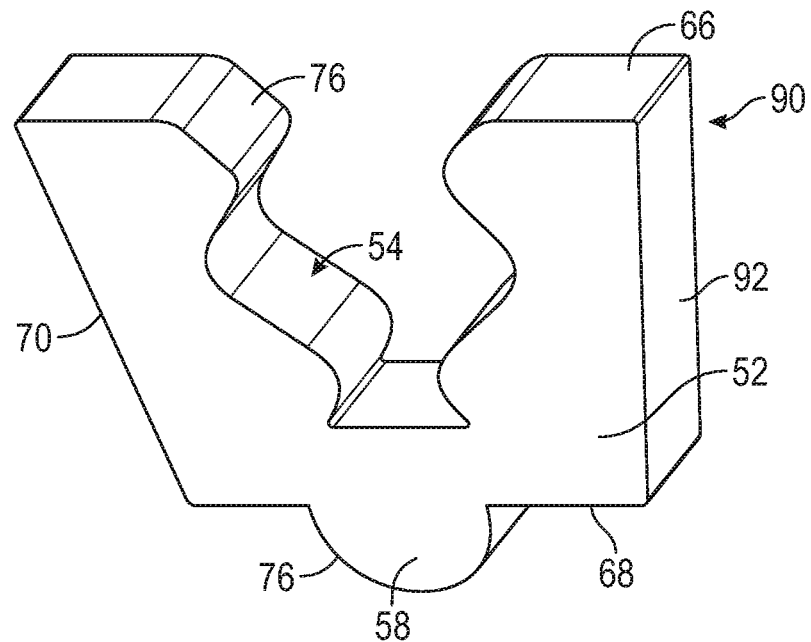
FIG. 8 is a perspective view of another embodiment of an airfoil component installation guide tool of the present application having a single alignment appendage comprising a seal rail tab.

FIG. 8 is a perspective view of airfoil component installation guide tool 90 of the present application having single alignment appendage 58 comprising a seal rail tab with surface 76. Guide tool 90 includes the same features as guide tool 50 but with guide body 52 not including wing 60 and alignment appendage 56. Thus, the same reference numbers are used in FIG. 7 and further description of features previously discussed is not provided for the sake of brevity.

Guide body 52 is shortened in the circumferential direction to not include wing 60 so that guide body 52 includes circumferential sides 70 and 92. Guide tool 90 of FIG. 8 provides a more compact tool that can be more readily transported by personnel and more easily stored on the person or in a tool box. Guide tool 90 still provides a single circumferential alignment reference point between guide tool 90 and rim portion 34 of rotor disk 30. Guide tool 90 provides a buffer for entry of blade root 40 into one of root slots 36 to facilitate alignment and prevent chipping of coatings on blade root 40 or platform 44 as compared to not using a guide tool.

Figure 9:
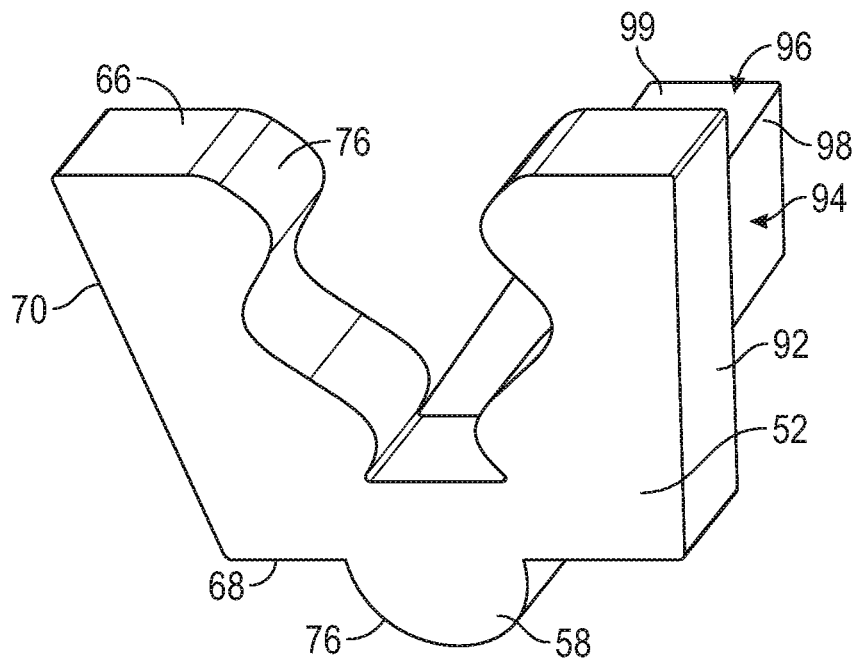
FIG. 9 is a perspective view of another embodiment of the airfoil component installation guide tool of FIG. 8 having a second alignment appendage comprising a guide rail.

FIG. 9 is a perspective view of another embodiment of an airfoil component installation guide tool 94. Relative to guide tool 90, as shown in FIG. 8, guide tool 94 includes a second alignment appendage 96 comprising a guide rail. Guide tool 94 includes the same features as guide tool 90 but with guide body 52 including alignment appendage 96. Thus, the same reference numbers are used in FIG. 9 as in FIG. 8 and further description of features previously discussed is not provided for the sake of brevity. Alignment appendage 96 can comprise an axial extension that has profile surfaces 98 configured to mate with broach portion 37. For example, profile surfaces 98 can comprise a semicircular shape with top surface 99 being flat. As such, alignment appendage 96 can be configured to interface with broach portion 37 (FIG. 2) and slide underneath one of blade roots 40 inserted in root portion 36. Thus, alignment appendage 96 can be axially slid into one of broach portions 37 to provide a second circumferential alignment reference point between guide tool 94 and rim portion 34 of rotor disk 30, in addition to the one provided by alignment appendage 58.

Guide tools 90 and 94 of FIGS. 8 and 9 can be used to install any of turbine blades 24 into rotor disk 30. In particular, either guide tool 90 or 94 may be used to facilitate installation of the last of the turbine blades 24 when a neighboring root portion 36 is not available for coupling with a guide tool due to the presence of a turbine blade 24, because alignment appendages 58 and 96 are circumferentially aligned with the root portion 36 into which one of turbine blades 24 is to be installed.

While an embodiment of the disclosure has been described including the second alignment appendage 96 absent a wing 60 or first alignment appendage 56, it will be appreciated that the scope of the disclosure is not so limited, and that it shall include various combinations of these features, such as a guide tool 50 that include a second alignment appendage 96 as well as the wing 60 and first alignment appendage 56, for example. Such an embodiment would be expected to enhance an alignment of the guide slot 54 with the root portion 36.

Figure 10:
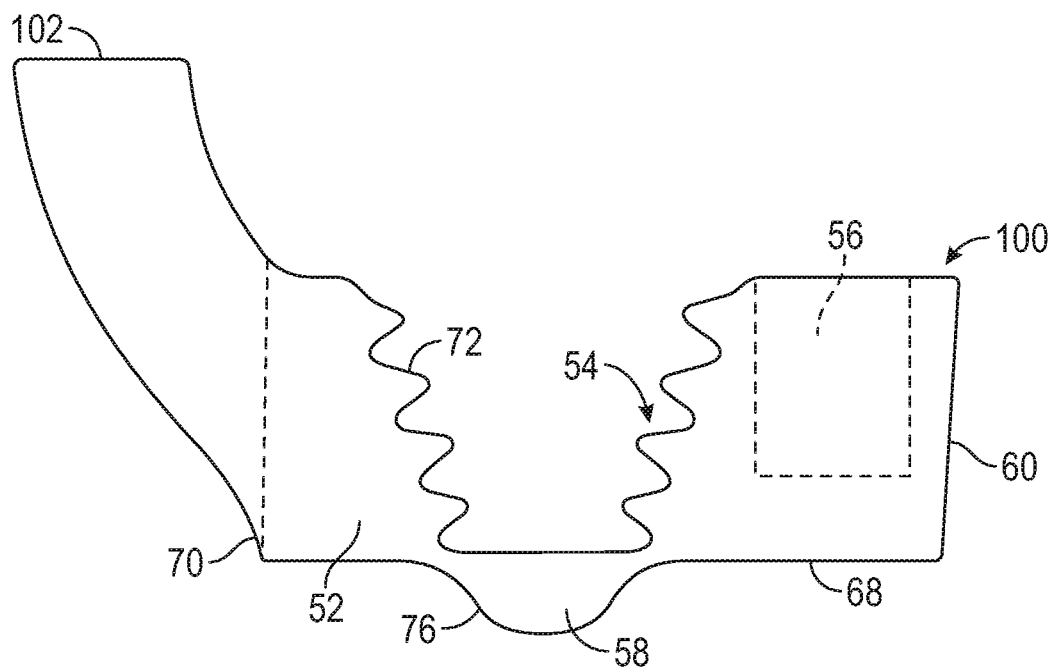
FIG. 10 is a front view of another embodiment of the airfoil component installation guide tool of FIG. 3 having a third alignment appendage comprising a guide wing.

FIG. 10 is a front view of an embodiment of an airfoil component installation guide tool 100 of FIG. 3 having third alignment appendage 102 comprising a guide wing. Guide tool 100 includes the same features as guide tool 50 with the addition of alignment appendage 102 to compliment alignment appendages 56 and 58. Thus, the same reference numbers are used in FIG. 10 and further description of features previously discussed is not provided for the sake of brevity.

Alignment appendage 102 can be configured to extend from a side of guide body 52 facing toward an already installed turbine blade 24. In the illustrated embodiment, alignment appendage 102 can extend from circumferential side 70, the side away from alignment appendage 56. Alignment appendage 102 comprises a radially outward extending wing that extends radially beyond guide slot 54. Alignment appendage 102 can be configured to reach platform 44 (FIG. 2) of an already installed turbine blade 24 that is adjacent to the turbine blade 24 to be installed with guide tool 100 at guide slot 54. Alignment appendage 102 can provide a shield or barrier to prevent platform 44 of the turbine blade 24 being installed from impacting platform 44 of the turbine blade 24 already installed. Thus, alignment appendage 102 can act as interference to prevent undesirable contact between adjacent turbine blades 24, such as if there is radial misalignment. Alignment appendage 102 can be thicker than body 52, such as by extending axially into the plane of FIG. 10. In other examples, alignment appendage can extend in between adjacent turbine blades 24 to prevent contact, such as between airfoils 46, platforms 44 or shanks 42. Thus, alignment appendage 102 can have a thickness that is equal to the clearance between two adjacent platforms to further insure that one platform does not contact another. Additionally, alignment appendage 102 can be configured to engage or abut platform 44 at a specific location in order to provide an additional circumferential alignment reference point.

Figure 11:
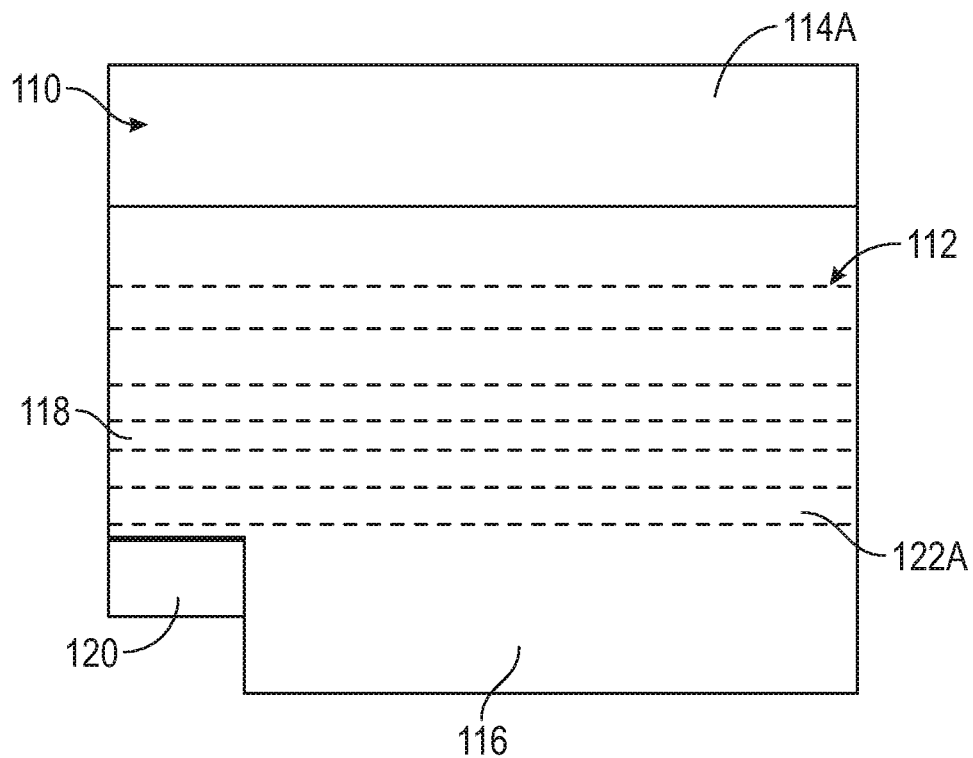
FIG. 11 is a side view of another embodiment of an airfoil component installation guide tool of the present application including a guide sleeve for attaching the guide tool to the root of an airfoil component.
Figure 12:
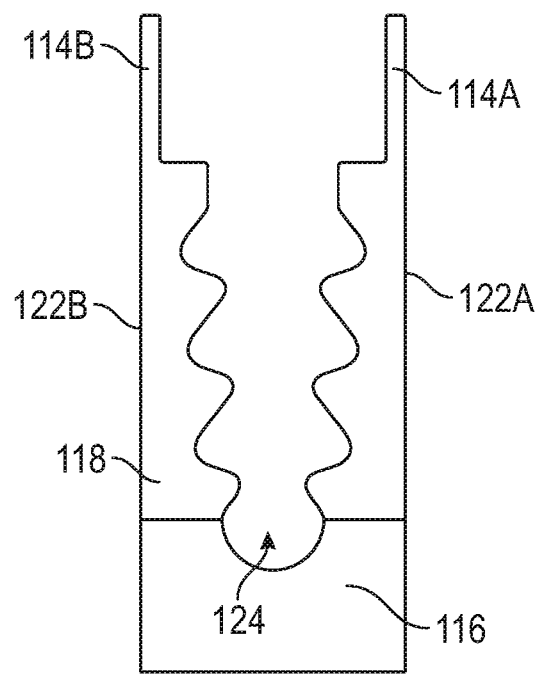
FIG. 12 is a front view of the guide sleeve of FIG. 11 showing radially extending flanges for engaging a shank portion of an airfoil component and a trough portion for engaging a bottom of the root portion.
Figure 13:
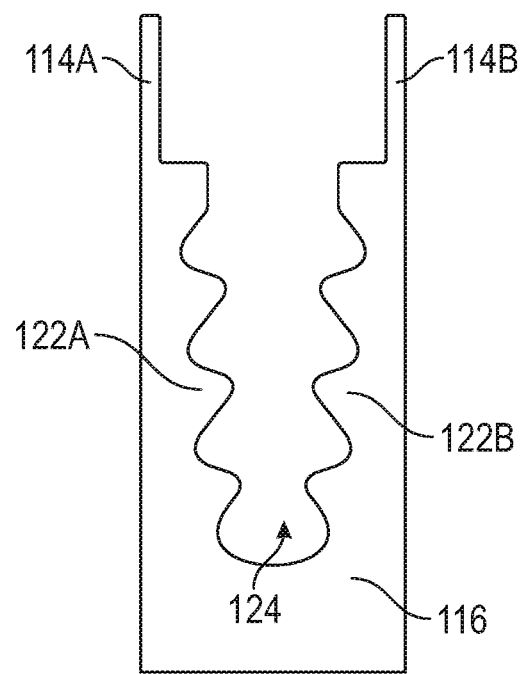
FIG. 13 is a rear view of the guide sleeve of FIG. 11 showing radially extending flanges for engaging a shank portion of an airfoil component and a trough portion for engaging a bottom of the root portion.

FIG. 11 is a side view of airfoil component installation guide tool 110 of the present application defining guide sleeve 112 for attaching guide tool 110 to root 40 (FIG. 2) of turbine blade 24. FIGS. 12 and 13 are front and rear views of guide sleeve 112 of FIG. 11 showing radially extending flanges 114A and 114B for engaging the shank 42 and platform 44 (FIG. 2) of turbine blade 24 and trough portion 116 for engaging a bottom of root 40. FIGS. 11-13 are discussed concurrently.

Guide tool 110 of FIGS. 11-13 defines guide sleeve 112 that can be attached to root 40 to provide a protective envelope to root 40. Guide sleeve 112 can be directly engaged with rotor disk 30 to facilitate aligned insertion of root 40 into root portion 36. Thus, guide tool 110 can provide a dual-purpose device that allows root 40 and platform 44, and any coatings thereon, to not have to be exposed between shipping and installation in rotor disk 30 in order to mitigate risk of damage to the coatings.

Guide tool 110 can comprise guide body 118, alignment appendage 120, sidewalls 122A and 122B and guide slot 124. Guide body 118 and alignment appendage 120 can function similarly as guide body 52 and alignment appendage 58 of guide tool 90 of FIG. 8, respectively. Sidewalls 122A and 122B extend axially from guide body 118 a length sufficient permit guide slot 124 to cover the full axial length of root 40 and can extend past platform 44. Sidewalls 122A and 122B thereby provide protection to any coatings on root 40 and platform 44. Trough 116 extends radially inward from sidewalls 122A and 122B to form a base for sleeve 112. Trough 116 is radially continuous with sidewalls 122 and 122B that can form guide slot 124. Trough 116 extends axially along sidewalls 122A and 122B to cover the bottom or radially inner end of root 40.

Flanges 114A and 114B extend radially outward from guide body 118 and sidewalls 122A and 122B to form barriers that can extend along shank 42 of turbine blade 26. In different embodiments, flanges 114A and 114B can cover all or portions of shank 42. In other embodiments, flanges 114A and 114B can be configured to contact platform 44. For example, flanges 114A and 114B can contact platform 44 to prevent sleeve 112 from readily sliding off of root 40 and protect coatings upon the platform 44. Flanges 114A and 114B can also be configured to engage other features of shank 42.

As mentioned, guide tool 110 can allow turbine blade 24 to move from a manufacturing facility to being installed within root portion 36 without exposing coatings on root 40, shank 42, or platform 44, thereby eliminating potential sources of damage to the coatings during shipping and installation.

Figure 14:
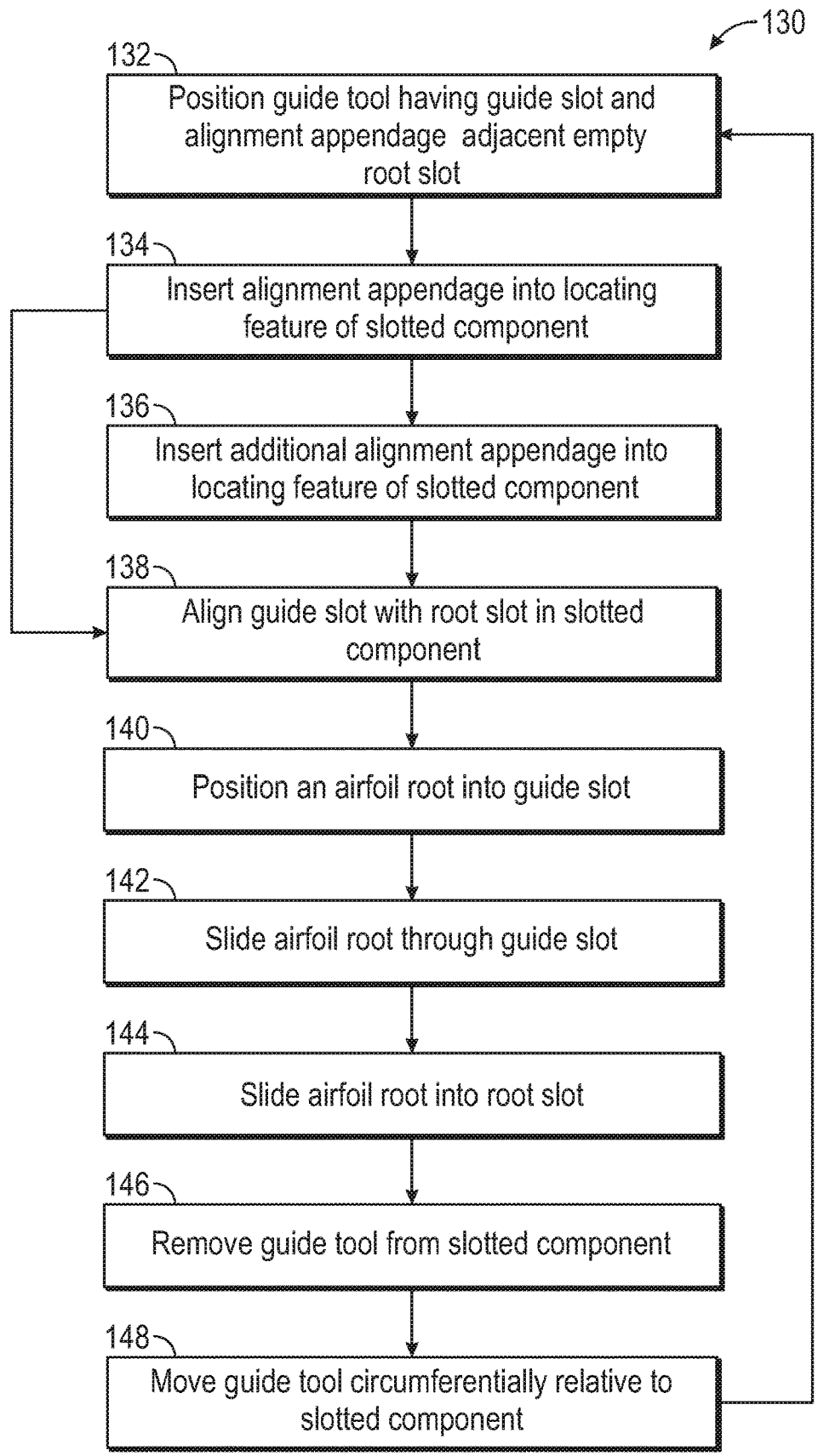
FIG. 14 is a block diagram showing a method for installing an airfoil component into a slotted component of a gas turbine engine using a guide tool having a guide slot and an alignment appendage.

FIG. 14 is a block diagram showing a method 130 of installing an airfoil component, such as turbine blade 24, into a slotted component, such as rotor disk 30, of a gas turbine engine using a guide tool, such as one or more of guide tools 50, 84, 90, 96, 100 and 110, having a guide slot and an alignment appendage.

At step 132, a guide tool can be selected that corresponds to the configuration of roots and slots in the gas turbine engine. For example, a guide tool can be selected that has a guide slot having surfaces that match the surfaces of the root slot, such as fir tree or dovetail geometry, for the airfoil component to be installed. The selected guide tool can then be placed adjacent a slotted component having all empty root slots, although, certain guide tools can be used to selectively install airfoil components in a partially bladed slotted component. Initially, any of guide tools 50, 84, 90, 96, 100 and 110 can be used to install the first airfoil component.

At step 134, a first alignment appendage of the selected guide tool can be engaged with a circumferential locating feature of the slotted component, such as rotor disk 30. In various examples, the alignment appendage can axially slide into the circumferential locating feature to provide axial alignment between the guide slot and the root slot. Additionally, because the circumferential distance between the guide slot and the alignment appendage is set to be the same as the circumferential distance between the circumferential locating feature and the root slot, axial engagement of the alignment appendage and the circumferential locating feature registers the guide slot to the root slot, both radially and circumferentially.

At step 136, any additional alignment appendages of the guide tool can be mated with a corresponding circumferential locating feature to provide additional degrees of registration. Only a single circumferential locating feature is needed to effectuate the guide tool. However, additional circumferential locating features can be advantageous to increase the registration between the guide tool and the slotted component to increase alignment and reduce the risk of damage.

At step 138, the guide slot can be aligned with the root slot. For example, due to engagement between the alignment appendage and the corresponding circumferential locating feature, the guide slot can become automatically aligned with the root slot. However, additional manual manipulation of the guide tool can be performed to ensure proper alignment. For example, surfaces of the guide slot can be visually inspected to ensure alignment with surfaces of the root slot.

At step 140, an airfoil component root of a selected airfoil component is positioned within the guide slot of the guide tool. Surfaces of the guide slot operate to radially and circumferentially align the surfaces of the root with surfaces of the root slot so they become axially aligned. The root can be manually eased into the guide slot to avoid damaging coating on the turbine blade. The material of the guide tool can be selected to avoid damaging any portion of the blade. For example, the material can be relatively soft compared to the hardness of the blade to prevent scratching the blade. The material can be, however, resilient and rigid enough to support the weight of the airfoil component within the guide tool. Additionally, the material can have a coefficient of friction that permits the root to easily slide along the guide slot.

At step 142, the root can be slid through the guide slot. The guide slot holds the root into circumferential and radial alignment with the root slot while it is axially sliding to permit clean entry of the root into the root slot without the blade undesirably impacting any adjacent interface or component that might cause damage. For example, the guide slot prevents the blade platform from impacting the platform of an adjacent, installed blade. Before the root leaves the guide slot, at least a portion of the root enters the root slot so that the mating root slot and root surfaces are aligned and the surfaces of the root slot can continue to guide the remainder of the blade root into the root slot.

At step 144, the root is slid completely into the root slot and out of the guide slot. Thus, the airfoil component becomes sufficiently supported by the slotted component and is disengaged or substantially disengaged from the guide tool.

At step 146, the guide tool can be removed from the slotted component. Any additional steps desired to temporarily or operationally secure the airfoil component within the root slot of the root component can be performed to prevent the installed airfoil component from being removed. Operational fastening means, such as those described with reference to FIG. 2, can be applied to the installed airfoil component after the complete set of airfoil components are installed.

At step 148, the guide tool can be repositioned for installation of another airfoil component into the slotted component. For example, the guide tool can simply be positioned adjacent an empty or un-bladed root slot for blading that root slot or a neighboring root slot. Thus, method 130 can be restarted for an additional airfoil component. Method 130 can be repeated until all but the final airfoil component is to be installed. At such point, method 130 can be repeated with one of guide tool 90 of FIG. 8 or guide tool 94 of FIG. 9.

While aspects of the disclosure have been described as turbine blade embodiments, it will be appreciated that the scope of the disclosure is not so limited, and may apply to other turbine components to which coatings may be applied and subsequently subject to aligning and installation. Examples of these other turbine components include turbine stators shrouds, combustion liners, ducts, and so on.

The various methods, components and guides described herein are able to advantageously prevent damaging or chipping of coated turbine parts during an installation process. The guide tools can avoid damage to the coating by providing a pre-alignment of the coated component with a mating slot (or an uncoated component with a coated slot) in an axial direction before the coated component is brought into axial engagement with the slotted component. Material of the guide tool can provide a soft buffer for the coated component before it is brought into contact and engagement with a hard component that can potentially cause damage to the coating. Thus, the present invention can avoid costly reworking of parts, such as subsequent stripping and re-coating processes, or subsequent adding of material back to the component, re-coating and re-grinding. Additionally, the various methods and components described herein produce parts that have aesthetically appealing and consistent final appearances, which can result in increased customer satisfaction and confidence in final product.

VARIOUS NOTES & EXAMPLES

Example 1 can include or use subject matter such as a guide for installing an airfoil component in a slotted component of a gas turbine engine. The guide can comprise a guide body that can comprise: a slot-facing side; an entry side; and a radially outer side surface connecting the slot-facing side and the entry side; a guide slot that can extend from the entry side to the slot-facing side and penetrating the radially outer side surface, the guide slot can have a silhouette matching that of a root portion of the airfoil component; and an alignment appendage that can extend from the guide body and having a geometry for axial engagement with a circumferential feature of the slotted component into which the airfoil component is to be installed.

Example 2 can include, or can optionally be combined with the subject matter of Example 1, to optionally include a guide body that can further comprises a radially inner side surface opposite the radially outer side surface; and an alignment appendage that can comprise a tab extending from the radially inner side surface to engage the circumferential feature.

Example 3 can include, or can optionally be combined with the subject matter of one or any combination of Examples 1 or 2 to optionally include a circumferential feature that can comprise a notch in a seal rail of the slotted component and the tab is configured to engage the notch.

Example 4 can include, or can optionally be combined with the subject matter of one or any combination of Examples 1 through 3 to optionally include an alignment appendage that can comprise a wing extending circumferentially from the guide body.

Example 5 can include, or can optionally be combined with the subject matter of one or any combination of Examples 1 through 4 to optionally include and alignment appendage that can further comprise an axial projection extending from the wing in a direction of the slot-facing side, the axial projection having a profile configured to mate with the silhouette of the guide slot.

Example 6 can include, or can optionally be combined with the subject matter of one or any combination of Examples 1 through 5 to optionally include a wing that can extend radially outward of the guide slot and is configured to be disposed between platforms of the airfoil component and an adjacent airfoil component installed in the slotted component.

Example 7 can include, or can optionally be combined with the subject matter one or any combination of Examples 1 through 6 to optionally include an alignment appendage that can comprise a guide rail extending axially from the slot-facing side.

Example 8 can include, or can optionally be combined with the subject matter of one or any combination of Examples 1 through 7 to optionally include a guide rail that can be configured to engage a broach slot in the slotted component radially inward of a root slot in the slotted component, the broach slot can be aligned with and disposed radially inward of the root slot.

Example 9 can include, or can optionally be combined with the subject matter of one or any combination of Examples 1 through 8 to optionally include a guide body that can further comprise a first flange and a second flange extending radially outward from the radially outer side surface on opposite circumferential sides of the guide slot.

Example 10 can include, or can optionally be combined with the subject matter of one or any combination of Examples 1 through 9 to optionally include a guide body that can further comprise a slot trough extending in a direction of the entry side radially inward of and in continuation with the guide slot.

Example 11 can include, or can optionally be combined with the subject matter of one or any combination of Examples 1 through 10 to optionally include a guide body that can be fabricated from a polymeric material.

Example 12 can include or use subject matter such as a gas turbine engine blade alignment device for use with a turbine rotor component comprising an annular disk portion extending in a radial direction from a central axis, a rim portion surrounding the annular disk portion in a circumferential direction, and a plurality of blade root slots extending through the rim portion in an axial direction, each blade root slot having a silhouette of a root geometry profile. The gas turbine engine blade alignment device can comprise: a guide tool that can comprise: a guide body that can include a guide slot having a shape matching the silhouette of the root geometry profile; and an axial projection that can extend from the guide body circumferentially spaced from the guide slot, the axial projection having a shape of the root geometry profile.

Example 13 can include, or can optionally be combined with the subject matter of Example 12, to optionally include a turbine rotor component that can define a first distance between adjacent blade root slots of the plurality of blade root slots, and a second distance between the guide slot and the axial projection equals the first distance.

Example 14 can include, or can optionally be combined with the subject matter of one or any combination of Examples 12 or 13 to optionally include a guide tool that can be configured to mate with the turbine rotor component so that the guide body can abut the rim portion and the guide slot can be aligned with a first of the plurality of blade root slots when the axial projection is inserted into a second of the plurality of blade root slots.

Example 15 can include, or can optionally be combined with the subject matter of one or any combination of Examples 12 through 14 to optionally include a first of the plurality of blade root slots and a second of the plurality of blade root slots that can be neighboring slots in the plurality of blade root slots.

Example 16 can include, or can optionally be combined with the subject matter of one or any combination of Examples 12 through 15 to optionally include a turbine rotor component that can further comprise a seal rail radially inward of the plurality of blade root slots, the seal rail can comprise a plurality of notches, each notch of the plurality notches can circumferentially align with each of the plurality of blade root slots; and a guide tool that can further comprise a radially inward tab configured to engage one of the notches.

Example 17 can include, or can optionally be combined with the subject matter of one or any combination of Examples 12 through 16 to optionally include each of the plurality of blade root slots including a broach slot that can extend radially inward from each blade root slot; and a guide tool that can include a guide rail extending axially from the guide body to engage at least one of the broach slots when the axial projection is inserted in a blade root slot.

Example 18 can include or use subject matter such as a method of installing an airfoil component having a root in a slotted component having a root slot in a gas turbine engine system that can comprise: axially inserting an alignment appendage of a guide tool into a circumferential locating feature of the slotted component to align a guide slot of the guide tool with the root slot of the slotted component; positioning the root of the airfoil component into the guide slot; and sliding the airfoil component through the guide slot and into the root slot.

Example 19 can include, or can optionally be combined with the subject matter of Example 18, to optionally include axially inserting the alignment appendage by inserting a guide root into a neighboring root slot of the root slot to align the guide slot of the guide tool with the root slot of the slotted component.

Example 20 can include, or can optionally be combined with the subject matter of one or any combination of Examples 18 or 19 to optionally include a axially inserting the alignment appendage by inserting a guide tab into a seal rail notch of the slotted component to align the guide slot of the guide tool with the root slot of the slotted component.

Example 21 can include, or can optionally be combined with the subject matter of one or any combination of Examples 18 through 20 to optionally include axially inserting the alignment appendage by inserting a guide rail into a broach slot aligned with and disposed radially inward of the root slot to align the guide slot of the guide tool with the root slot of the slotted component.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, The claimed invention is:

1. A guide for installing an airfoil component in a slotted component of a gas turbine engine, the guide comprising:
   a guide body comprising:
      a slot-facing side;
      an entry side;
      a radially outer side surface connecting the slot-facing side and the entry side; and
      a radially inner side surface opposite the radially outer side surface;
   a guide slot extending from the entry side to the slot-facing side and penetrating the radially outer side surface, the guide slot having a silhouette matching that of a root portion of the airfoil component; and
   an alignment appendage extending from the guide body and having a geometry for axial engagement with a circumferential feature of the slotted component into which the airfoil component is to be installed; wherein:
   the alignment appendage comprises a tab extending from the radially inner side surface to engage the circumferential feature; and
   the circumferential feature comprises a notch in a seal rail of the slotted component and the tab is configured to engage the notch.

2. The guide of claim 1, wherein the alignment appendage further comprises a wing extending circumferentially from the guide body.

3. The guide of claim 2, wherein the alignment appendage further comprises an axial projection extending from the wing in a direction of the slot-facing side, the axial projection having a profile configured to mate with the silhouette of the guide slot.

4. The guide of claim 2, wherein the wing extends radially outward of the guide slot and is configured to be disposed between platforms of the airfoil component and an adjacent airfoil component installed in the slotted component.

5. The guide of claim 1, wherein the alignment appendage further comprises a guide rail extending axially from the slot-facing side.

6. The guide of claim 5, wherein the guide rail is configured to engage a broach slot in the slotted component radially inward of a root slot in the slotted component, the broach slot aligned with and disposed radially inward of the root slot.

7. The guide of claim 1, wherein the guide body further comprises a first flange and second flange extending radially outward from the radially outer side surface on opposite circumferential sides of the guide slot.

8. The guide of claim 7, wherein the guide body further comprises a slot trough extending in a direction of the entry side radially inward of and in continuation with the guide slot.

9. The guide of claim 1, wherein the guide body is fabricated from a polymeric material.

10. A gas turbine engine blade alignment device for use with a turbine rotor component comprising an annular disk portion extending in a radial direction from a central axis, a rim portion surrounding the annular disk portion in a circumferential direction, and a plurality of blade root slots extending through the rim portion in an axial direction, each blade root slot having a silhouette of a root geometry profile, the gas turbine engine blade alignment device comprising:
   a guide tool comprising:
      a guide body including a guide slot having a shape matching the silhouette of the root geometry profile; and
      an axial projection extending from the guide body circumferentially spaced from the guide slot, the axial projection having a shape of the root geometry profile;
   wherein the turbine rotor component defines a first distance between adjacent blade root slots of the plurality of blade root slots, and a second distance between the guide slot and the axial projection equals the first distance.

11. The device of claim 10, wherein the guide tool is configured to mate with the turbine rotor component so that the guide body abuts the rim portion and the guide slot is aligned with a first of the plurality of blade root slots when the axial projection is inserted into a second of the plurality of blade root slots.

12. The device of claim 11, wherein the first of the plurality of blade root slots and the second of the plurality of blade root slots are neighboring slots in the plurality of blade root slots.

13. The device of claim 10, wherein:
   the turbine rotor component further comprises a seal rail radially inward of the plurality of blade root slots, the seal rail comprising a plurality of notches, each notch of the plurality notches circumferentially aligned with each of the plurality of blade root slots; and
   the guide tool further comprises a radially inward tab configured to engage one of the notches.

14. The device of claim 10, wherein:
   each of the plurality of blade root slots includes a broach slot extending radially inward from each blade root slot; and
   the guide tool includes a guide rail extending axially from the guide body to engage at least one of the broach slots when the axial projection is inserted in a blade root slot.

15. A guide for installing an airfoil component in a slotted component of a gas turbine engine, the guide comprising:
   a guide body comprising:
      a slot-facing side;
      an entry side; and
      a radially outer side surface connecting the slot-facing side and the entry side;
   a guide slot extending from the entry side to the slot-facing side and penetrating the radially outer side surface, the guide slot having a silhouette matching that of a root portion of the airfoil component; and
   an alignment appendage extending from the guide body and having a geometry for axial engagement with a circumferential feature of the slotted component into which the airfoil component is to be installed;
   wherein the alignment appendage comprises a guide rail extending axially from the slot-facing side; and
   wherein the guide rail is configured to engage a broach slot in the slotted component radially inward of a root slot in the slotted component, the broach slot aligned with and disposed radially inward of the root slot.

16. The guide of claim 15, wherein the guide body further comprises a first flange and second flange extending radially outward from the radially outer side surface on opposite circumferential sides of the guide slot.

17. The guide of claim 16, wherein the guide body further comprises a slot trough extending in a direction of the entry side radially inward of and in continuation with the guide slot.

18. The guide of claim 15, wherein the guide body is fabricated from a polymeric material.

19. A guide for installing an airfoil component in a slotted component of a gas turbine engine, the guide comprising:
   a guide body comprising:
      a slot-facing side;
      an entry side; and
      a radially outer side surface connecting the slot-facing side and the entry side;
   a guide slot extending from the entry side to the slot-facing side and penetrating the radially outer side surface, the guide slot having a silhouette matching that of a root portion of the airfoil component; and
   an alignment appendage extending from the guide body and having a geometry for axial engagement with a circumferential feature of the slotted component into which the airfoil component is to be installed;
   wherein the alignment appendage comprises a wing extending circumferentially from the guide body; and
   wherein the wing extends radially outward of the guide slot and is configured to be disposed between platforms of the airfoil component and an adjacent airfoil component installed in the slotted component.

20. The guide of claim 19, wherein the alignment appendage further comprises an axial projection extending from the wing in a direction of the slot-facing side, the axial projection having a profile configured to mate with the silhouette of the guide slot.

21. The guide of claim 19, wherein the guide body is fabricated from a polymeric material.

* * * * *